United States Patent [19]
Douglas

[11] Patent Number: 4,827,297
[45] Date of Patent: May 2, 1989

[54] PHOTOGRAPHIC FILM ASSEMBLAGE HAVING INSTANT FILM

[75] Inventor: Lawrence M. Douglas, South Easton, Mass.

[73] Assignee: Polaroid Corporation, Cambridge, Mass.

[21] Appl. No.: 193,658

[22] Filed: May 13, 1988

[51] Int. Cl.$^4$ .................. G03B 17/52; G03B 17/26
[52] U.S. Cl. ........................ 354/276; 354/86
[58] Field of Search ............. 354/83, 84, 85, 86, 354/276, 304, 202

[56] References Cited

U.S. PATENT DOCUMENTS

| | | | |
|---|---|---|---|
| 3,561,339 | 2/1971 | Erlichman | 354/86 |
| 3,705,537 | 12/1972 | Paglia | 354/202 |
| 3,874,875 | 4/1975 | Land | 354/86 X |
| 3,922,700 | 11/1975 | Asano et al. | 354/276 |
| 3,940,774 | 2/1976 | Ivester | 354/83 |

Primary Examiner—A. A. Mathews
Attorney, Agent, or Firm—Alfred E. Corrigan

[57] ABSTRACT

A film assemblage includes a plurality of self-developing film units mounted in a cassette having first and second sections. The first section has an aperture for the exposure of the film units mounted within the cassette. Each film unit includes a flat body position joined to a rupturable pod or container of processing liquid. A support member located in the second section supports the flat portions of the film units to properly orient one of them adjacent to the film exposure aperture. A resilient, upwardly biased extension on said support member engages only the processing liquid container of an adjacent film unit to gently urge it and containers located about it into proper location relative to an exit slot in the cassette.

9 Claims, 2 Drawing Sheets

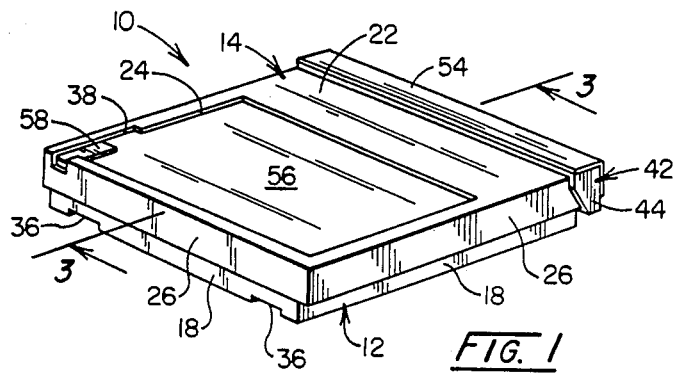
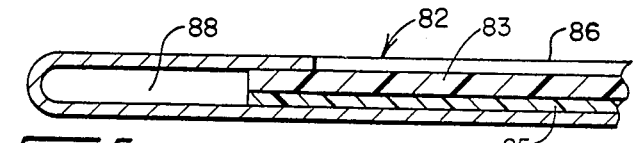
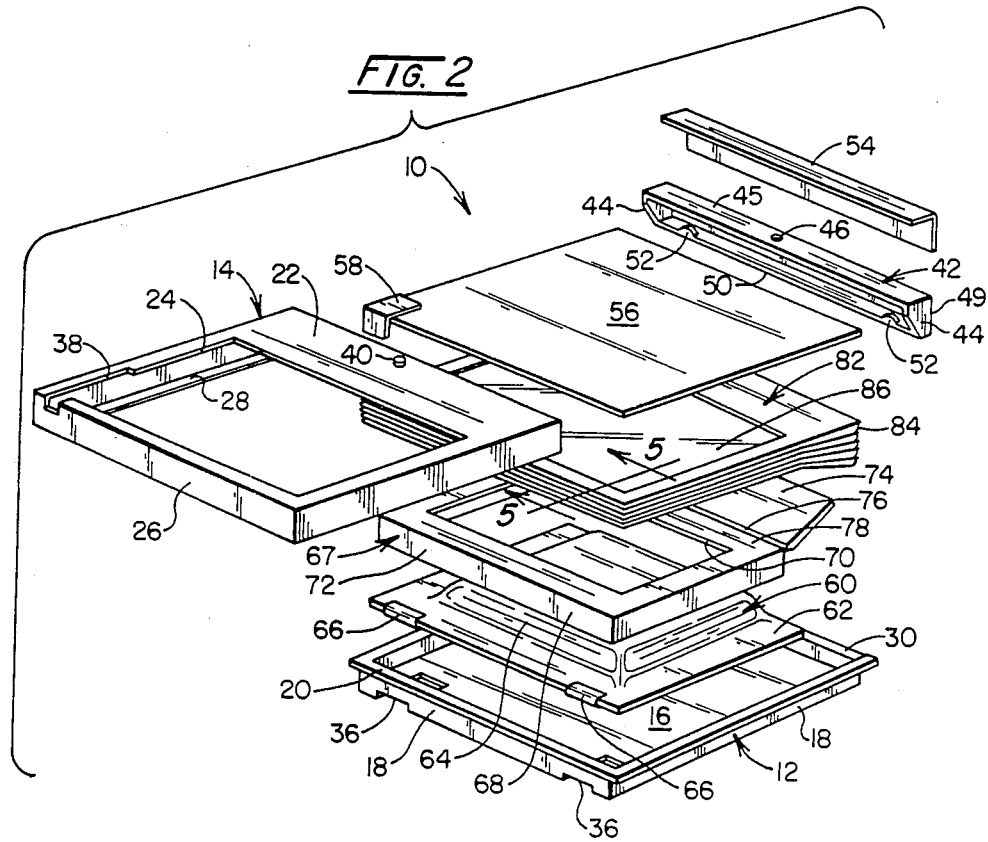

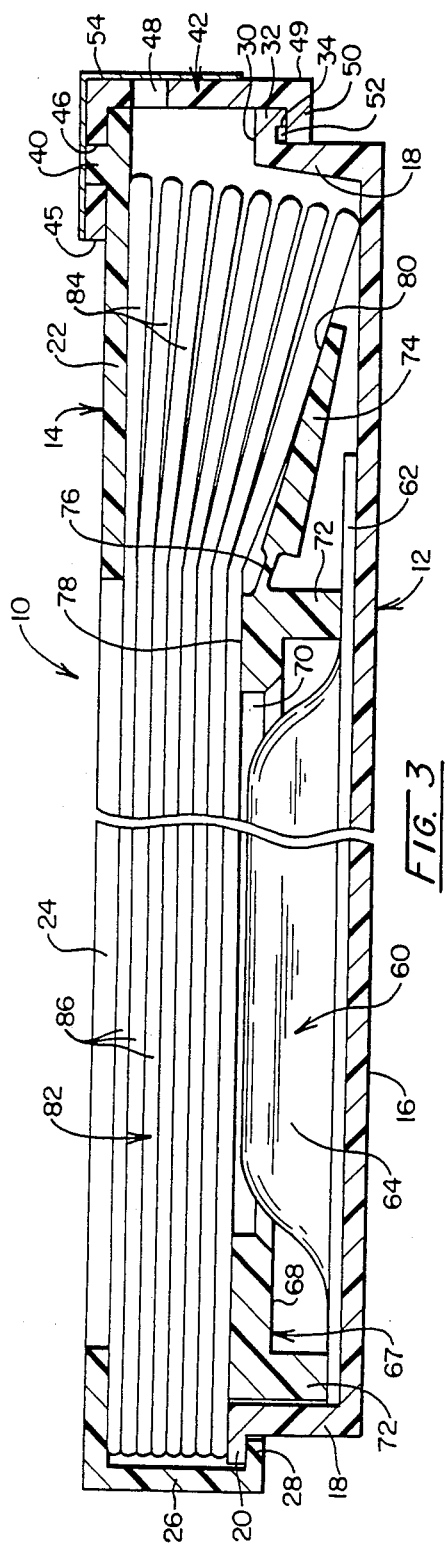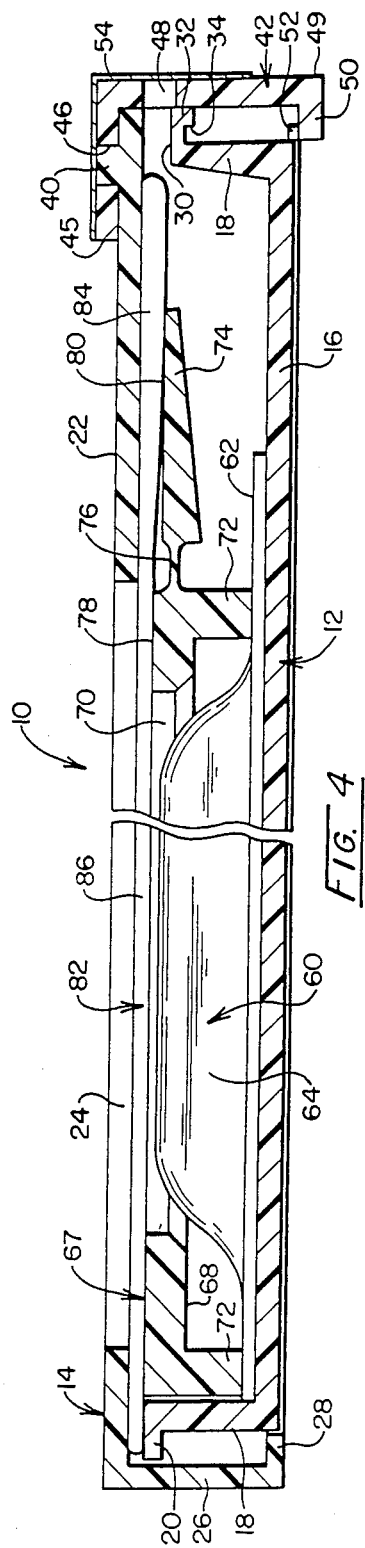

PHOTOGRAPHIC FILM ASSEMBLAGE HAVING INSTANT FILM

This application is related to my copending application Ser. No. 193,802 filed on even date herewith and entitled "Instant Type Camera For Receiving A Collapsible Film Cassette".

BACKGROUND OF THE INVENTION

1. Field of the Invention

The invention relates to a photographic film assemblage including a stack of instant or self-developing film units supported within a film cassette by a member having a generally rigid section for supporting major portions of the film units and an extension for resiliently supporting ends of the film units containing pods of processing liquid with a minimum of force.

2. Description of the Prior Art

Photographic film assemblages of the type which the present invention is directed to generally include a film cassette whose configuration is that of a parallelpiped. Stacked within the cassette is a plurality of instant or self-developing film units with an uppermost film unit in the stack having its photosensitive area located in alignment with and adjacent to an exposure aperture formed in a forward wall thereof and its leading end, which carries a rupturable container of processing liquid, located in alignment with an elongate slot or egress formed in a leading end wall of the cassette. A spring platen is positioned between the lowermost film unit in the stack and a bottom wall of the cassette for resiliently urging the entire stack of film units toward the forward wall. A dark slide, formed from any suitable opaque materal, is located betwen the uppermost film unit in the stack and the cassette's forward wall to prevent premature exposure of the film units by the ambient light during the loading of the film assemblage into a camera.

After loading of the film assemblage into the camera and the removal of the dark slide, the uppermost film unit is photographically exposed and moved to the exterior of the cassette via the egress for subsequent processing of its latent image. It has been found that movement of the exposed film unit from the film cassette may result in the next adjacent film unit in the stack being dragged along therewith into the egress thus resulting in the two film units becoming stuck therein because of the dimensions of the egress. This dragging of the next adjacent film unit is due in part to the sliding fricitional forces that are built up between the two film units during such relative movement, and partly as a result of forces which are biasing the stack of film units toward the film cassette's forward wall.

SUMMARY OF THE INVENTION

The present invention relates to a photographic film assemblage comprising a collapsible film cassette having a plurality of instant or self-developing film units stacked therein with an uppermost film unit in the stack having its photosensitive area located adjacent to an exposure aperture in a forward wall of the cassette and its leading end, which contains a rupturable pod or container of processing liquid located in alignment with an egress in a leading end wall of the cassette.

The stack of film units is sustained for movement toward the forward wall by a support having a generally planar member and an extension connected thereto by a living resilient hinge. The generally planar member is adapted to support the main body of the film units, i.e., the film areas thereof, while the extension is adapted to support only the pod ends of the film units. The biasing force of the extension, which may be only one-tenth of a pound, is barely sufficient to support the stack of pods. As a result, the pod ends of the film units droop relative to each other such that there is minimum contact between adjacent pods. This arrangement thus provides a condition wherein the uppermost film unit in the stack has its associated pod in general alignment with the egress while the next underlying film unit has its associated pod located below and thus out of alignment with the egress. Thus, there is reduced sliding friction between the pods of the upper two film units during removal of the top film unit, subsequent to its exposure. Further, even if there were a great enough frictional force between the two film units to cause the underlying one to be dragged toward the leading end wall of the cassette, such movement would end abruptly when its pod, which is not in alignment with the egress, engages the interior surface of the leading end wall. Accordingly, the aforementioned problem of the upper film unit dragging the underlying film unit through the egress is substantially eliminated. Another benefit of supporting the pod ends with such a small force is that it reduces damage to the pods which may result from higher forces being applied thereto.

The cassette also houses a battery for energizing electrically powered components of the camera. It is preferably disposed intermediate the support and a bottom wall of the cassette. The battery has contacts which are adapted to be engaged by contacts of a camera circuit which extend through openings in the bottom wall of the cassette.

In its preferred form the cassette is collapsible in a telescoping fashion for particular use with a camera of the type disclosed in said copending application. In this form the film support is provided as a member mounted for movement with a bottom section of the cassette, which telescopes with a top section as it moves toward and from the exposure aperture formed in the top section.

Objects of the invention not clear from the above will in part be obvious and will in part appear hereinafter.

The invention comprises the photographic film assemblage possessing the construction, combination of elements and arrangements of parts which are exemplified in the following detailed disclosure, and the scope of the application of which will be indicated in the claims.

BRIEF DESCRIPTION OF THE DRAWINGS

The best mode contemplated in carrying out this invention is illustrated in the accompanying drawings in which:

FIG. 1 is a perspective view of a film assemblage having a collapsible film cassette, the cassette being shown in extended condition;

FIG. 2 is an exploded view of the film assemblage;

FIG. 3 is an enlarged sectional view taken along line 3—3 of FIG. 1 showing the collapsible cassette fully expanded;

FIG. 4 is a similar view showing the cassette almost completely collapsed; and

FIG. 5 is an enlarged sectional view through a film unit taken along line 5—5 of FIG. 2.

DETAILED DESCRIPTION OF THE INVENTION

With specific reference to the drawings, the invention is shown incorporated in a film assemblage having a cassette which is indicated generally at 10. When this film cassette is inserted in a suitable camera, its bottom is adapted to be engaged by cassette biasing springs. This cassette 10 is designed to receive film units of the instant type and has a novel film support for engaging that type of film. The support includes a processing liquid pod biasing means which is not necessarily limited for use in a cassette of the collapsible type which will be described as the preferred form.

The cassette 10 is illustrated as being in the form of a parallelpiped having a lower base or bottom cover section 12 telescoping within an upper or cover section 14 for relative vertical sliding movement. These sections are preferably made of an opaque plastic. The section 12 is a tray-like form and has a flat solid bottom wall 16 and an upwardly extending sidewall 18 around its peripheral edge. An outwardly extending lip 20 projects transversely from three sides of the sidewall 18.

The top section 14 is of inverted tray-like form and has a flat cover wall 22 with a rectangular film exposure aperture 24 formed therein toward the trailing end of the cassette 10. The wall 22 has a depending flange 26 along its periphery except at its leading edge where the flange is eliminated. This flange 26 has an inwardly-directed stop lip 28 at its lower edge for engaging the outwardly-directed stop lip 20 on sidewall 18. Note that sidewall 18 extends along the trailing end of the section 12 and its sides but at the leaing end of the section is reduced in height as indicated at 30 to provide for passage of a film unit during processing. This reduced section of the sidewall 18 includes a stop lip 32 which is provided with a downwardly-opening groove 34 and its function is for assembly alignment and stability of the filled cassette.

At the trailing end of the base or bottom cover 12 is a pair of laterally-spaed access openings 36 (see FIG. 1) formed in the sidewall 18 and bottom wall 16 for receiving battery contact pads of a camera.

The top or cover section 14 is further provided at its trailing end with a pick slot 38 formed at the edge of aperture 24 and in a portion of the flange 26 providing the trailing end wall of the top section 14. This pick slot 38 is for the purpose of receiving a moveable pick (not shown) in a camera to first advance a dark slide 56 and then, on subsequent actuations of the pick, the successive film units 82 from the cassette 10. A strip of opaque flexible material 58 attached to the slide 56 serves to block ambient light from entering the film pack via slot 38 prior to its insertion into a camera.

At its leading end (to the right as viewed in FIG. 2) the top wall 22 carries an upstanding retaining button 40. A generally L-shaped end cap 42 is provided for slipping over the leading end of telescoping sections 12 and 14 to close the passage therebetween at the leading end of the cassette but is of a form to permit the relative telescoping movement of these sections. This end cap 42 is preferably of plastic and its angular cross-section has its ends closed at 44. Its upper horizontal flange 45 is provided with an opening 46 midway of its ends which receives the button 40 when it is positioned on the end of the wall 22. It is further provided with a transverse film exit slot or egress 48 in its vertical flange 49 which will be directly below the wall 22. This flange 49 has an inwardly-extending stop lip 50 on its lower edge which has retaining lugs 52 that fit into the groove 34 on lip 32 of lower section 12 when the sections 12 and 14 are extended as far a possible as shown in FIG. 3. This extended position is limited by the stop lip 50 of the end cap and the stop lip 28 of the flange 26 of section 14 cooperating with the respective stop lips 30 and 20 of the section 12. However, as the cassette collapses, as indicated in FIG. 4, movement of the section 12 farther into the section 14 will be permitted but the film exit slot 48 will not be obstructed until the last film unit has been removed from the cassette. A flexible light shield 54 fits over the end cap 42 and is fixedly retained thereon at its upper end by suitable means (not shown) and is detachably secured to the cassette 10 at its loewr end so as to cover the film exit slot or egress 48 until after insertion of the cassette 10 into the camera. Subsequent to such insertion, removal of the dark slide is effective to enable it to detach the lower end of the shield 54 thus enabling the sequential removal of film units from the cassette 10.

A flat battery 60 is provided in the lower section 12 of the cassette for energizing electrically powered components of the camera. This battery 60 has a flat base 62 of rectangular outline which rests on the bottom wall 16 and has a hump container portion 64 of rectangular outline located centrally on the upper side thereof with its flat edges sealed thereto. This battery has a pair of terminals 66 (best seen in FIG. 2) on the trailing edge of its base 62 which fit into the access openings 36 in the section 12 for engagement by contacts of the camera circuit. It will be apparent that the battery will move upwardly with the section 12 as the cassette collapses.

A film support plate 67 is located in the tray-like structure of section 12 and in engagement with the base 62 of battery 60. This film support plate has a body 68 of rectangular form with a rectangular opening 70 into which the battery hump 64 may extend. The body 68 is provided on three sides with a depending skirt 72 which rests on the flat base 62 of the battery outwardly of the hump 64. The body 68 is further provided at its leading end with a film pod supporting extension 74 which extends forwardly therefrom. This extension is in the form of a rectangular tab or shelf and is connected to the forward end of the body 68 by means of a resilient tongue or living hinge connection 76. Thus, the film support plate 67 includes a flat rectangular supporting surface 78 around the opening 70 and an upper angular pod-supporting surface 80 on the extension 74.

The support plate 67 is adapted to support a stack of self-contained and self-developing film units 82. Each of the film units includes superposed sheets 83 and 85 with a rupturable pod 84 at its leading end and a processing liquid trap 88 at the other end. In this cassette 10 each of the film units 82 includes a main body 86 of substantially uniform thickness throughout its length with the rupturable pod end 84 at its leading end flexibly connected to the main body 86. It will be noted from FIG. 5 that unlike conventional self-developing or instant film units the trailing end of the film unit 82 does not have a thick absorbent material located in a trap 88. It can be formed the same as a conventional instant film unit except that the thick absorbent trap material will not be assembled into the fold-over trap pocket. The cavity formed will still serve as the trap 88 for excess processing liquid or reagent in the processing of the film in the camera. Thus, the stack of film units 82 will be more compact due the superposed main bodies 86 each of which is of uniform thickness from adjacent its pod end to its trailing end. The support plate 67 does not push against the pods 84 as it does against the main bodies 86 but only resiliently supports them.

It may not be clear from the above description how the trap 88 would retain its shape and continue to hold the excess developer liquid as it was squeezed by the conventional rollers within the conventional camera which rupture the pods 84 to distribute the processing liquid between the sheets 85 and 87 in the main body 86 of the film unit. This film unit is not designed to have the trap 88 pass through such rollers. To the extent necessary for a complete understanding of this invention the aforesaid copending application is incorporated herein by reference. As indicated, this collapsible film cassette is particularly useful with the camera disclosed in said copending application. In that camera, film cassette biasing springs are provided for engaging the exterior surface of the bottom wall 16 for sequentially moving the section 12 of the cassette 10 into the section 14 as the film units 82 are removed from the cassette. This film assemblage will result in a flatter film plane due to the fact that the support plate 67 pushes against a stack of film having a uniform cross-section from trailing end to pod end. The support plate 67 sits on the flat battery edge seals. There is no internal spring within the cassette 10. The bottom section 12 slides into the upper section 14 with the film stack, dark slide, support plate and battery inside. Film plane flatness results when an external force is applied to the bottom section, as by springs in the camera. As each film unit is removed from the cassette for processing, the cassette sections telescope by the amount of the film thickness.

Since certain changes may be made in the above apparatus without departing from the scope of the invention herein involved, it is intended that all matter contained in the above description or shown in the accompanying drawings shall be interpreted as illustrative and not in a limiting sense.

What is claimed:

1. A photographic film assemblage comprising:
a film cassette including a first wall having an exposure aperture therein and a second wall having an egress therein;
a plurality of self-developing film units stacked within said film cassette, each of said film units includes a generally flat body portion and a rupturable container of processing liquid extending from one end of said flat body portion; and
means for supporting said film units for movement toward said first wall with a photosensitive area of said flat body portion of an endmost film unit located adjacent to said exposure aperture and its associated said container of processing liquid located in alignment with said egress, said supporting means including a first generally planar portion for engaging only said flat body portion of an adjacent one of said film units and a second portion resiliently connected to an edge of said first portion for engaging only said container of processing liquid of said adjacent film unit for resiliently supporting and lightly urging all of said containers of processing liquid toward said first wall such that only said container of said endmost film unit is in alignment with said egress.

2. A photographic film assemblage as defined in claim 1 wherein said film cassette comprises first and second sections which are adapted for incremental movement toward each other as said film units are sequentially exposed and moved from said film casette via said egress, said first and second walls being in said first section.

3. A photographic film assemblage according to claim 2 further including a battery partially disposed within said support means, said second section further includes means for exposing terminals of said battery to electrical contacts in a camera.

4. A photographic film assemblage according to claim 2 in which said second section is of tray-like form and said first section is of inverted tray-like form with said second section being configured to telescope upwardly within said first section.

5. A photographic film assemblage according to claim 4 in which said first and second sections have cooperating stops for limiting relative extension of said telescoping first and second sections.

6. A photographic film assemblage according to claim 5 in which said support means is supported by said second section for movement therewith toward said first wall of said first section therewith.

7. A photographic film assemblage according to claim 6 in which said second section has an upstanding flange position which will always be below said egress as long as at least one of said film units is inside of said film cassette.

8. A photographic film assemblage as defined in claim 2 wherein upon removal of all of said film units from said film cassette, said support means is fully nested within said second section, and said second section is fully nested within said first section.

9. A photographic film assemblage as defined in claim 3 wherein upon removal of all of said film units from said film cassette, said battery and said support means are fully nested within said second section and said second section is fully nested within said first means.

* * * * *